(12) United States Patent
Merrick et al.

(10) Patent No.: US 7,752,401 B2
(45) Date of Patent: Jul. 6, 2010

(54) METHOD AND APPARATUS TO AUTOMATICALLY COMMIT FILES TO WORM STATUS

(75) Inventors: Jeffrey Dale Merrick, Mountain View, CA (US); William P. McGovern, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 201 days.

(21) Appl. No.: 11/339,979

(22) Filed: Jan. 25, 2006

(65) Prior Publication Data

US 2007/0174565 A1 Jul. 26, 2007

(51) Int. Cl.
*G06F 12/16* (2006.01)
(52) U.S. Cl. .................... 711/161; 711/162; 707/668; 713/165
(58) Field of Classification Search ........... None
See application file for complete search history.

(56) References Cited

U.S. PATENT DOCUMENTS

| | | | |
|---|---|---|---|
| 4,635,145 A | 1/1987 | Horie et al. | |
| 4,727,512 A | 2/1988 | Birkner et al. | |
| 4,775,969 A | 10/1988 | Osterlund | |
| 5,163,148 A | 11/1992 | Walls | |
| 5,235,695 A | 8/1993 | Pence | |
| 5,269,022 A | 12/1993 | Shinjo et al. | |
| 5,297,124 A | 3/1994 | Plotkin et al. | |
| 5,438,674 A | 8/1995 | Keele et al. | |
| 5,455,926 A | 10/1995 | Keele et al. | |
| 5,485,321 A | 1/1996 | Leonhardt et al. | |
| 5,555,371 A | 9/1996 | Duyanovich et al. | |
| 5,638,509 A | 6/1997 | Dunphy et al. | |
| 5,666,538 A | 9/1997 | DeNicola | |
| 5,673,382 A | 9/1997 | Cannon et al. | |
| 5,774,292 A | 6/1998 | Georgiou et al. | |
| 5,774,715 A | 6/1998 | Madany et al. | |
| 5,805,864 A | 9/1998 | Carlson et al. | |
| 5,809,511 A | 9/1998 | Peake | |
| 5,809,543 A | 9/1998 | Byers et al. | |
| 5,835,953 A | 11/1998 | Ohran | |

(Continued)

FOREIGN PATENT DOCUMENTS

CA 2 256 934 A1 6/2000

(Continued)

OTHER PUBLICATIONS

Chris Lueth, "WORM Storage on Magnetic Disks Using SnapLock Compliance™ and SnapLock Enterprise™", Network Appliance, Inc., Sep. 2003, sections 1-5, 13 pages.

(Continued)

*Primary Examiner*—Brian R Peugh
*Assistant Examiner*—Alan Otto
(74) *Attorney, Agent, or Firm*—Perkins Coie LLP (57) ABSTRACT

A system is provided to commit data to persistent storage. The system comprises a configuration component to set an autocommit period, a scanner to detect that the autocommit period has expired for a file and a commit component to commit the file to write once read many (WORM) status In one embodiment, when an autocommit period is set, the system may be configured to automatically commit a file to WORM status if the file has not been changed for the autocommit period.

15 Claims, 5 Drawing Sheets

U.S. PATENT DOCUMENTS

| | | |
|---|---|---|
| 5,854,720 A | 12/1998 | Shrinkle et al. |
| 5,857,208 A | 1/1999 | Ofek |
| 5,864,346 A | 1/1999 | Yokoi et al. |
| 5,872,669 A | 2/1999 | Morehouse et al. |
| 5,875,479 A | 2/1999 | Blount et al. |
| 5,911,779 A | 6/1999 | Stallmo et al. |
| 5,949,970 A | 9/1999 | Sipple et al. |
| 5,961,613 A | 10/1999 | DeNicola |
| 5,963,971 A | 10/1999 | Fosler et al. |
| 6,021,408 A | 2/2000 | Ledain et al. |
| 6,023,709 A | 2/2000 | Anglin et al. |
| 6,029,179 A | 2/2000 | Kishi |
| 6,041,329 A | 3/2000 | Kishi |
| 6,044,442 A | 3/2000 | Jesionowski |
| 6,049,848 A | 4/2000 | Yates et al. |
| 6,061,309 A | 5/2000 | Gallo et al. |
| 6,067,587 A | 5/2000 | Miller et al. |
| 6,070,224 A | 5/2000 | LeCrone et al. |
| 6,098,148 A | 8/2000 | Carlson |
| 6,128,698 A | 10/2000 | Georgis |
| 6,131,142 A | 10/2000 | Kamo et al. |
| 6,131,148 A | 10/2000 | West et al. |
| 6,134,660 A | 10/2000 | Boneh et al. |
| 6,163,856 A | 12/2000 | Dion et al. |
| 6,173,293 B1 | 1/2001 | Thekkath et al. |
| 6,173,359 B1 | 1/2001 | Carlson et al. |
| 6,195,730 B1 | 2/2001 | West |
| 6,225,709 B1 | 5/2001 | Nakajima et al. |
| 6,247,096 B1 | 6/2001 | Fisher et al. |
| 6,260,110 B1 | 7/2001 | LeCrone et al. |
| 6,266,784 B1 | 7/2001 | Hsiao et al. |
| 6,269,423 B1 | 7/2001 | Kishi |
| 6,269,431 B1 | 7/2001 | Dunham |
| 6,282,609 B1 | 8/2001 | Carlson |
| 6,289,425 B1 | 9/2001 | Blendermann et al. |
| 6,292,889 B1 | 9/2001 | Fitzgerald et al. |
| 6,301,677 B1 | 10/2001 | Squibb |
| 6,304,880 B1 | 10/2001 | Kishi |
| 6,317,814 B1 | 11/2001 | Blendermann et al. |
| 6,324,497 B1 | 11/2001 | Yates et al. |
| 6,327,418 B1 | 12/2001 | Barton |
| 6,336,163 B1 | 1/2002 | Brewer et al. |
| 6,336,173 B1 | 1/2002 | Day, III et al. |
| 6,339,778 B1 | 1/2002 | Kishi |
| 6,341,329 B1 | 1/2002 | LeCrone et al. |
| 6,343,342 B1 | 1/2002 | Carlson |
| 6,353,837 B1 | 3/2002 | Blumenau |
| 6,360,232 B1 | 3/2002 | Brewer et al. |
| 6,389,503 B1 | 5/2002 | Georgis et al. |
| 6,397,307 B2 | 5/2002 | Ohran |
| 6,408,359 B1 | 6/2002 | Ito et al. |
| 6,487,561 B1 | 11/2002 | Ofek et al. |
| 6,496,791 B1 | 12/2002 | Yates et al. |
| 6,499,026 B1 | 12/2002 | Smith et al. |
| 6,557,073 B1 | 4/2003 | Fujiwara et al. |
| 6,557,089 B1 | 4/2003 | Reed et al. |
| 6,578,120 B1 | 6/2003 | Stanley et al. |
| 6,615,365 B1 | 9/2003 | Jenevein et al. |
| 6,625,704 B2 | 9/2003 | Winokur et al. |
| 6,654,912 B1 | 11/2003 | Viswanathan et al. |
| 6,658,435 B1 | 12/2003 | McCall et al. |
| 6,694,447 B1 | 2/2004 | Leach et al. |
| 6,725,331 B1 | 4/2004 | Kedem |
| 6,766,520 B1 | 7/2004 | Rieschl et al. |
| 6,779,057 B2 | 8/2004 | Masters et al. |
| 6,779,058 B2 | 8/2004 | Kishi et al. |
| 6,779,081 B2 | 8/2004 | Arakawa et al. |
| 6,816,941 B1 | 11/2004 | Carlson et al. |
| 6,816,942 B2 | 11/2004 | Okada et al. |
| 6,834,324 B1 | 12/2004 | Wood |
| 6,850,964 B1 | 2/2005 | Brough et al. |
| 6,877,016 B1 | 4/2005 | Hart et al. |
| 6,898,600 B2 | 5/2005 | Fruchtman et al. |
| 6,915,397 B2 | 7/2005 | Lubbers et al. |
| 6,931,557 B2 | 8/2005 | Togawa et al. |
| 6,950,263 B2 | 9/2005 | Suzuki et al. |
| 6,973,534 B2 | 12/2005 | Dawson et al. |
| 6,978,283 B1 | 12/2005 | Edwards et al. |
| 6,978,325 B2 | 12/2005 | Gibble et al. |
| 7,007,043 B2 | 2/2006 | Farmer et al. |
| 7,020,779 B1 | 3/2006 | Sutherland |
| 7,032,126 B2 | 4/2006 | Zalewski et al. |
| 7,055,009 B2 | 5/2006 | Factor et al. |
| 7,096,331 B1 | 8/2006 | Haase et al. |
| 7,100,089 B1 | 8/2006 | Phelps |
| 7,111,136 B2 | 9/2006 | Yamagami |
| 7,111,194 B1 | 9/2006 | Schoenthal et al. |
| 7,127,388 B2 | 10/2006 | Yates et al. |
| 7,152,078 B2 | 12/2006 | Yamagami |
| 7,155,465 B2 * | 12/2006 | Lee et al. .................... 707/204 |
| 7,155,586 B1 | 12/2006 | Wagner et al. |
| 7,200,726 B1 | 4/2007 | Gole et al. |
| 7,203,726 B2 | 4/2007 | Hasegawa |
| 7,346,623 B2 | 3/2008 | Prahlad et al. |
| 2002/0004835 A1 | 1/2002 | Yarbrough |
| 2002/0016827 A1 | 2/2002 | McCabe et al. |
| 2002/0026595 A1 | 2/2002 | Saitou et al. |
| 2002/0091670 A1 | 7/2002 | Hitz et al. |
| 2002/0095557 A1 | 7/2002 | Constable et al. |
| 2002/0144057 A1 | 10/2002 | Li et al. |
| 2002/0166079 A1 | 11/2002 | Ulrich et al. |
| 2002/0199129 A1 | 12/2002 | Bohrer et al. |
| 2003/0004980 A1 | 1/2003 | Kishi et al. |
| 2003/0005313 A1 | 1/2003 | Gammel et al. |
| 2003/0025800 A1 | 2/2003 | Hunter et al. |
| 2003/0037211 A1 | 2/2003 | Winokur |
| 2003/0046260 A1 | 3/2003 | Satyanarayanan et al. |
| 2003/0120676 A1 | 6/2003 | Holavanahalli et al. |
| 2003/0126136 A1 | 7/2003 | Omoigui |
| 2003/0126388 A1 | 7/2003 | Yamagami |
| 2003/0135672 A1 | 7/2003 | Yip et al. |
| 2003/0149700 A1 | 8/2003 | Bolt |
| 2003/0158766 A1 | 8/2003 | Mital et al. |
| 2003/0182350 A1 | 9/2003 | Dewey |
| 2003/0188208 A1 | 10/2003 | Fung |
| 2003/0225800 A1 | 12/2003 | Kavuri |
| 2004/0015731 A1 | 1/2004 | Chu et al. |
| 2004/0098244 A1 | 5/2004 | Dailey et al. |
| 2004/0103147 A1 | 5/2004 | Flesher et al. |
| 2004/0167903 A1 | 8/2004 | Margolus et al. |
| 2004/0168034 A1 | 8/2004 | Homma et al. |
| 2004/0181388 A1 | 9/2004 | Yip et al. |
| 2004/0181707 A1 | 9/2004 | Fujibayashi |
| 2005/0010529 A1 | 1/2005 | Zalewski et al. |
| 2005/0044162 A1 | 2/2005 | Liang et al. |
| 2005/0063374 A1 | 3/2005 | Rowan et al. |
| 2005/0065962 A1 | 3/2005 | Rowan et al. |
| 2005/0066118 A1 | 3/2005 | Perry et al. |
| 2005/0066225 A1 | 3/2005 | Rowan et al. |
| 2005/0076070 A1 | 4/2005 | Mikami |
| 2005/0076261 A1 | 4/2005 | Rowan et al. |
| 2005/0076262 A1 | 4/2005 | Rowan et al. |
| 2005/0076264 A1 | 4/2005 | Rowan et al. |
| 2005/0097260 A1 | 5/2005 | McGovern et al. |
| 2005/0108302 A1 | 5/2005 | Rand et al. |
| 2005/0144407 A1 | 6/2005 | Colgrove et al. |
| 2005/0182910 A1 | 8/2005 | Stager |
| 2005/0240813 A1 | 10/2005 | Okada et al. |
| 2005/0257000 A1 | 11/2005 | Sonoda et al. |
| 2006/0010177 A1 * | 1/2006 | Kodama .................... 707/204 |
| 2006/0010301 A1 | 1/2006 | Yagawa |
| 2006/0047895 A1 | 3/2006 | Rowan et al. |
| 2006/0047902 A1 | 3/2006 | Passerini |
| 2006/0047903 A1 | 3/2006 | Passerini |

| | | | |
|---|---|---|---|
| 2006/0047905 | A1 | 3/2006 | Matze et al. |
| 2006/0047925 | A1 | 3/2006 | Perry |
| 2006/0047989 | A1 | 3/2006 | Delgado et al. |
| 2006/0047998 | A1 | 3/2006 | Darcy |
| 2006/0047999 | A1 | 3/2006 | Passerini et al. |
| 2006/0143376 | A1 | 6/2006 | Matze et al. |
| 2006/0259160 | A1* | 11/2006 | Hood et al. .................. 700/20 |

FOREIGN PATENT DOCUMENTS

| | | |
|---|---|---|
| EP | 0 845 733 A2 | 6/1998 |
| EP | 0 869 460 A2 | 10/1998 |
| EP | 1 058 254 A2 | 12/2000 |
| EP | 1 122 910 A1 | 8/2001 |
| EP | 1 233 414 A2 | 8/2002 |
| EP | 1333379 A2 | 8/2003 |
| EP | 1671231 | 6/2006 |
| WO | WO-99006912 | 2/1999 |
| WO | WO-99003098 | 11/1999 |
| WO | WO 01/18633 A1 | 3/2001 |
| WO | WO-0118633 A1 | 3/2001 |
| WO | WO-0225445 A2 | 3/2002 |
| WO | WO 03/067438 A2 | 8/2003 |
| WO | WO-03067438 A2 | 8/2003 |
| WO | WO 2004/084010 A2 | 9/2004 |
| WO | WO-2004084010 A2 | 9/2004 |
| WO | WO-2005031576 A2 | 4/2005 |
| WO | WO-2006023990 A2 | 3/2006 |
| WO | WO-2006023991 A2 | 3/2006 |
| WO | WO-2006023992 A2 | 3/2006 |
| WO | WO-2006023993 A2 | 3/2006 |
| WO | WO-2006023994 A1 | 3/2006 |
| WO | WO-2006023995 A2 | 3/2006 |

OTHER PUBLICATIONS

"Network Appliance WORM Storage Solution: SEC 17 a-4(f) Compliance Assessment", Network Appliance, Inc., Jul. 10, 2003, pp. i-20.
Simon L. Garfinkel et al., "Remembrance of Data Passed: A Study of Disk Sanitization Practices", IEEE Security and Privacy, vol. 1, No. 1, 2003, 19 pages.
Decru, "Decru Datafort E-Series Storage Security Appliances, Transparent Data Security for Network Attached Storage (NAS)", 2004. 2 pages.
Joan Daemen et al., "Note on Naming", Rijndael, Sep. 4, 2003, 2 pages.
Joan Daemen et al., "AES Proposal: Rijndael", The Rijndael Block Cipher, Document Version 2, Mar. 9, 1999, 45 pages.
"Alacritus Announces Disk-Based Successor to Tape", Knapp Comm., Aug. 21, 2002.
"Alacritus Creates 'Next Critical Step' in Disaster Recovery for Patrick Air Force Base, Securitus VTL Sets the Pace", Apr. 20, 2004.
"Alacritus to Demo Chronospan Continuous Data Protection with the Cisco MDS 9000", Apr. 1, 2004.
"Alacritus, Hitachi CP and Nissho Team to Create Virtual Tape Library Appliance: Industry's First Virtual Tape Library Appliance to Replace Storage Tape Libraries", Alacritus Software, Inc., Jun. 25, 2001.
"Alacritus, Hitachi CP and Nissho Team to Create Virtual Tape Library" internetnews.com, Jun. 25, 2001.
"Alacritus and Network Appliance Deliver Advanced Virtual Tape Library, Solution Shortens Backup Windows, Accelerates Data Recovery, and Simplifies Backup Management", Dec. 7, 2004.
"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup Performance and Scalability", Alacritus Software, Jul. 8, 2002.
"Alacritus Software Announces Securitus I, The Industry's First Virtual Tape Library Solution: Securitus I Hearlds Advent of 'Disruptive Technology' that Serves as Replacement to Tape Libraries", Alacritus Software, Inc. Jun. 25, 2001.
"Alacritus Software Announces Securitus I, The Industry's First Virtual Tape Library Solution: Securitus I Hearlds Advent of 'Disruptive Technology' that Serves as Replacement to Tape Libraries", Alacritus Software, Inc. Apr. 9, 2002.
"Alacritus Software Announces Virtual Tape Library Support for Legato Networker Data Protection Solution", Alacritus Software, Inc., Jan. 8, 2002.
"Alacritus Software's Chronospan: Make Time for Continuous Data Protection", Aberdeen Group, Inc., Oct. 2003.
"Alacritus Software FAQs" Alacritus Software, Inc. Jul. 2001.
"Alacritus Software's Securitus: Defining the Way to Virtual Tape Libraries", Aberdeen Group, Inc. Jul. 2003.
"Alacritus Software's Securitus I: Pointing the Way to Virtual Tape Libraries" Aberdeen Group, Inc. Mar. 2002.
Baltazar, Henry "More Intelligence is on the Way" eWEEK, Sep. 15, 2003.
Baltazar, Henry "Weaving Apps into SAN Fabric" eWEEK, Mar. 24, 2003.
Barrett, Alex, "The Case for Network Smarts", Storage Magazine, Jun. 2003.
Biggar, Heidi, "Alacritus Enables Disk-Based Backup", InfoStor, Sep. 2001.
Biggar, Heidi, "Disk and Tape Forge New Partnerships in backup Arena" InfoStor, Nov. 2001.
Camphusein, Alicia, "Hitachi Inks OEM Deal with Legato", Knapp Comm., Jul 2002.
"Case Study Shizuoka-ken Noukyou Densan Center K.K., Reducing Management Costs Through Tapeless Backup At an iDC", Apr. 7, 2004.
"Chronospan" Alacritus Website, Oct. 2003.
"Cisco and Storage ISVs to Demo Protocol-Based Interface between Storage Appliances and the Cisco MDS 9000", Mar. 30, 2004.
"Continuous Data Protection: Business Continuity for the Era of Networked Storage: An Executive White Paper", Aberdeen Group, Inc., Jul 2003.
"Customer Success" Alacritus Website, Oct. 2003.
Joan Daemen et al., "AES Proposal: Rijndael", The Rijndael Block Cipher, Document Version 2, Mar. 9, 1999, 45 pages.
Joan Daemen et al., "Note on Naming", Rijndael, Sep. 4, 2003, 2 pages.
Decru, "Decru Datafort E-Series Storage Security Appliances, Transparent Data Security for Network Attached Storage (NAS)", 2004. 2 pages.
"Disk-Based Data Protection" Alacritus Software, Inc., Jul. 2001.
"Disk-Based Data Protection" Alacritus Software, Inc., Sep. 2001.
"Disk-Based Data Protection" Alacritus Software, Inc., Sep. 2002.
Simon L. Garfinkel et al., "Rememberance of Data Passed: A Study of Disk Sanitization Practices", IEEE Security and Privacy, vol. 1, No. 1, 2003 19 pages.
Hill, David "Alacritus Software's Securitus: Defining the Way to Virtual Taped Libraries" Aberdeen Group, Inc. Jul. 2003.
"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library", Alacritus Software, Inc., Oct. 3, 2001.
Hatfield. "Write Read Verify Feature Set". May 14, 2004.
Komeiga, Kevin, "Vendor Pushes Disk Backup Over Tape" SearchStorage.com, Jan. 10, 2003.
Chris Lueth, "WORM Storage on Magnetic Disks Using SnapLock Compliance™ and SnapLock Enterprise™", Network Applicance, Inc., Sep. 2003, sections 1-5 13 pages.
"Manageability: Securitus v. Tape", Alacritus Website, Oct. 2003.
Microsoft Windows XP, released 2001.
"Network Appliance WORM Storage Solution: SEC 17 a-4(f) Compliance Assessment", Network Appliance, Inc., Jul. 10, 2003, pp. i-20.
"No Changes Required: Securitus v. Tape" Alacritus Website, Oct. 2003.
Novell NetWare Server Disks and Storage Devices Administration Guide. Netware 5.1, Jan. 2000, pp. 1-60.
Payack, Paul JJ, "Alacritus Lines Up OEM Partners for Virtual Tape Library Push" The (451) Storage & Systems, Oct. 4, 2002.

Payack, Paul JJ, "Alacritus Software Announces Continuous Data Protection with New Chronospan Technology" Oct. 28, 2003.
Payack, Paul JJ "Alacritus Software Announces New Customers for Securitus VTLA", Alacritus Software, Inc. Jan. 13, 2004.
Preston, W. Curtis, "Surprise! Cheap Disks Cure Slow Backup", Storage Magazine, Jun. 1, 2002.
"Product Brief: Rhapsody/Alacritus-Securitus/Xpath Virtual Tape in the Fabric", The Enterprise Storage Group, Aug. 2002.
"Scalability: Securitus v. Tape", Alacritus Website, Oct. 2003.
"Seamless Integration", Alacritus Website, Oct. 2003.
"Securitus", Alactritus Website, Oct. 2003.
"Securitus I White Paper: Disk Based Data Protection from Alacritus Software" Alacritus Software, Inc. Jul. 2001.
"Securitus White Paper: Disk Based Data Protection from Alacritus Software", Alacritus Website, Oct. 2003.
"Strengths: Securitus v. Tape", Alacritus Website, Oct. 2003.
"Testimonials", Alacritus Website, Oct. 2003.
"The SNIA Data Management Forum Created to Tackle Data Protection and Information Lifecycle Management Issues: Enhanced Backup Solutions Initiative Rolls Efforts into New SNIA Forum" Storage Networking Industry Association, Oct. 13, 2003.
"Topologies", Alacritus Website, Oct. 7, 2003.
Trimmer, Don "Tape Free Backup/Recovery: Requirements and Advantages: Virtualization Technology Will Encompass Many Applications, One of the Most Significant Possibly Being Backup/Recovery", InfoStor, Mar. 2002.
"Virtual Tape Library Technology Brochure", Alacritus Software Inc., Jul. 2001.
International Search Report PCT/US2006/0027525 dated Nov. 2009; pp. 1-4.
Written Opinion PCT/US2006/002725 dated Nov. 5, 2009; pp. 1-6.

* cited by examiner

METHOD AND APPARATUS TO AUTOMATICALLY COMMIT FILES TO WORM STATUS

FIELD OF THE INVENTION

At least one embodiment of the present invention pertains to networked storage systems and, more particularly, to a method and apparatus to automatically commit files to WORM status.

BACKGROUND

Many businesses rely on some form of WORM (write once, read many) data storage to store critical data. In many industries, such as the financial services and healthcare industries, businesses are required by strict records-retention regulations to archive important data, such as emails, transaction information, patient records, audit information, as well as other types of documents and data. Such records-retention regulations include, for example, Securities Exchange Commission (SEC) Rule 17a-4 (17 C.F.R. §240.17a-4(f)), which regulates broker-dealers; Health Insurance Portability and Accountability Act (HIPAA), which regulates companies in the healthcare industry; Sarbanes-Oxley (SOX), which regulates publicly traded companies; 21 C.F.R. Part 11, which regulates certain companies in the life sciences industry; and, DOD 5015.2-STD, which regulates certain government organizations; etc. Regulatory agencies generally recognize the ability of WORM data storage to ensure the permanence of archived data and therefore often require that only non-erasable, non-rewritable WORM storage be used for meeting their regulations. Software applications that manipulate data that may be subject to records-retention regulations are sometimes referred to as compliance applications.

Some existing systems (e.g., networked storage systems) provide a conventional (hierarchical) file system interface in a storage server to allow users to access stored data and to designate at least a subset of the data as WORM data through the file system interface. A networked storage system may include one or more storage servers, which may be storage appliances. A storage server may provide services related to the organization of data on mass storage devices, such as disks. Some of these storage servers are commonly referred to as filers or file servers. An example of such a storage server is any of the Filer products made by Network Appliance, Inc. in Sunnyvale, Calif. The storage appliance may be implemented with a special-purpose computer or a general-purpose computer. Depending on the application, various networked storage systems may include different numbers of storage servers. Various applications, including compliance applications, may be permitted to create and modify data on a storage appliance.

Some compliance applications do not have a built-in capability to assign a retention time to files or to commit files to WORM status. The files therefore may need to be committed to WORM status manually (e.g., by an administrator copying the files to a WORM storage device). On the other hand, some compliance applications may not have a capability to notify a storage system of when the application has completed the modifying operations on a file so that the file may be treated as closed. Furthermore, when a compliance application communicates with a storage server via open communications protocols, such as NFS or CIFS, the network traffic may not be indicative of the status of a file with respect to the status of the file as being open or closed for further modifications. For example, NFS does not have a mechanism to indicate when a file is closed. CIFS does have a mechanism of indicating that a file has been closed, but there are many applications that will close a file and then reopen it for writing again.

SUMMARY

A system and method are provided to commit files to WORM status. The system comprises a configuration component to set an autocommit period; a scanner to detect that the autocommit period has expired for a file; and a commit component to commit the file to write once read many (WORM) status.

Other aspects of the invention will be apparent from the accompanying figures and from the detailed description that follows.

BRIEF DESCRIPTION OF THE DRAWINGS

One or more embodiments of the present invention are illustrated by way of example and not limited to the figures of the accompanying drawings, in which like references indicate similar elements and in which.

DETAILED DESCRIPTION

As described in detail below, the technique introduced herein addresses issues associated with committing files to WORM status even where an application that modified the file does not provide information of whether the file will not be modified any further. It will be noted that, for the purposes of this description, a file may be considered to have a WORM status if the file cannot be deleted or modified until a predetermined end of retention period. In one embodiment an administrator may be permitted to configure a storage system to automatically commit files to WORM status after the files have not been modified for a predetermined period of time. This predetermined period of time may be referred to as an autocommit period. The autocommit period may be dependent upon a particular application, as for some applications the files may need to remain opened for writing longer than for other applications. For example, the autocommit period may be applicable to files storing financial records.

As described in further detail below, in one embodiment of the present invention, a user (e.g., an administrator) may designate a volume on a storage server as a WORM volume and set an autocommit period associated with that volume (e.g., at least two hours for some systems). When an autocommit period is set, the storage server may automatically commit a file to WORM status if the file has not been changed for the autocommit period. In one embodiment, a file that has been committed to WORM status remains unmodifiable for a predetermined retention period, which may be a default value. In one embodiment, the storage server may send out an Enhanced Messaging Service (EMS) message to a designated recipient (e.g., an administrator) every time the system automatically commits a file to WORM status.

In one embodiment, the present invention may be implemented in the context of a storage-oriented network, e.g., a network that includes one or more storage servers that store and retrieve data on behalf of one or more clients. Such a network may be used, for example, to provide multiple users with access to shared data or to backup mission critical data. An example of such a network is illustrated in FIG. 1.

Figure 1:
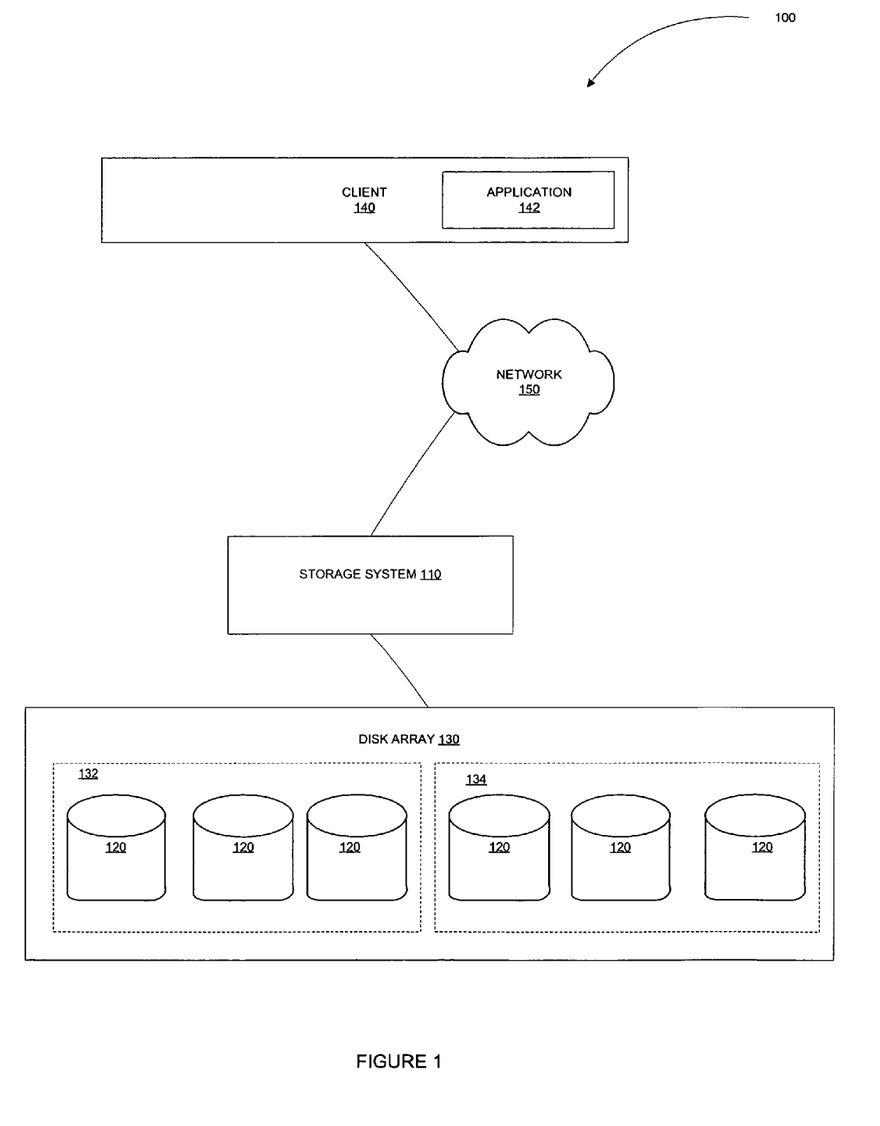
FIG. 1 is a schematic block diagram of an environment including a storage system that may be used with one embodiment of the present invention.

FIG. 1 is a schematic block diagram of an environment 100 including a storage system 110 that may be advantageously used with one embodiment of the present invention. The storage system 110, in one embodiment, may be configured to access information requested by clients such as a client 140 via a network 150. For example, the storage system 110 may store files created or modified by an application 142 running on the client 140. The application 142 may be a compliance application.

The storage system 110 may store data on any type of attached array of writable storage device media such as video tape, optical, DVD, magnetic tape, bubble memory, electronic random access memory, micro-electro mechanical and any other similar media adapted to store information, including data and parity information. However, as illustratively described herein, the data is preferably stored on disks 120, such as hard disk drives (HDD) and/or direct access storage devices (DASD), of an array 130.

In one embodiment, storage of information on array 130 may be implemented as one or more storage "volumes," such as a volume 132 and a volume 134, that comprise a collection of physical storage disks 120 cooperating to define an overall logical arrangement of virtual block number (vbn) space on the volumes. Each logical volume is generally, although not necessarily, associated with its own file system. The disks within a logical volume are typically organized as one or more groups, wherein each group may be operated as a redundant array of independent disks (RAID). Most RAID implementations, such as a RAID-4 level implementation, enhance the reliability/integrity of data storage through the redundant writing of data "stripes" across a given number of physical disks in the RAID group, and through the appropriate storing of parity information with respect to the striped data. An illustrative example of a RAID implementation is a RAID-4 level implementation, although it will be understood that other types and levels of RAID implementations may be used in accordance with the inventive principles described herein. A volume may be designated, e.g., at the time of volume creation, as a WORM volume, such that at least some files on a WORM volume may be committed to a WORM status to remain unmodifiable for a predetermined retention period.

As noted above, the storage system 110 may service client requests over the computer network 150. The computer network 150 may comprise a point-to-point connection or a shared medium, such as a local area network. Illustratively, the computer network 150 may be embodied as an Ethernet network or a Fibre Channel (FC) network. The client 140 may communicate with the storage system over network 150 by exchanging discrete frames or packets of data according to pre-defined protocols, such as the Transmission Control Protocol/Internet Protocol (TCP/IP).

The client 140 may be a general-purpose computer configured to execute applications 142. Moreover, the client 140 may interact with the storage system 110 in accordance with a client/server model of information delivery. That is, the client may request the services of the storage system, and the system may return the results of the services requested by the client by exchanging packets over the network 150. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

It will be noted that any or all of the components of system 100 and associated hardware may be used in various embodiments of the present invention. However, other configurations of the networked data storage system may include more or fewer devices discussed above.

Figure 2:
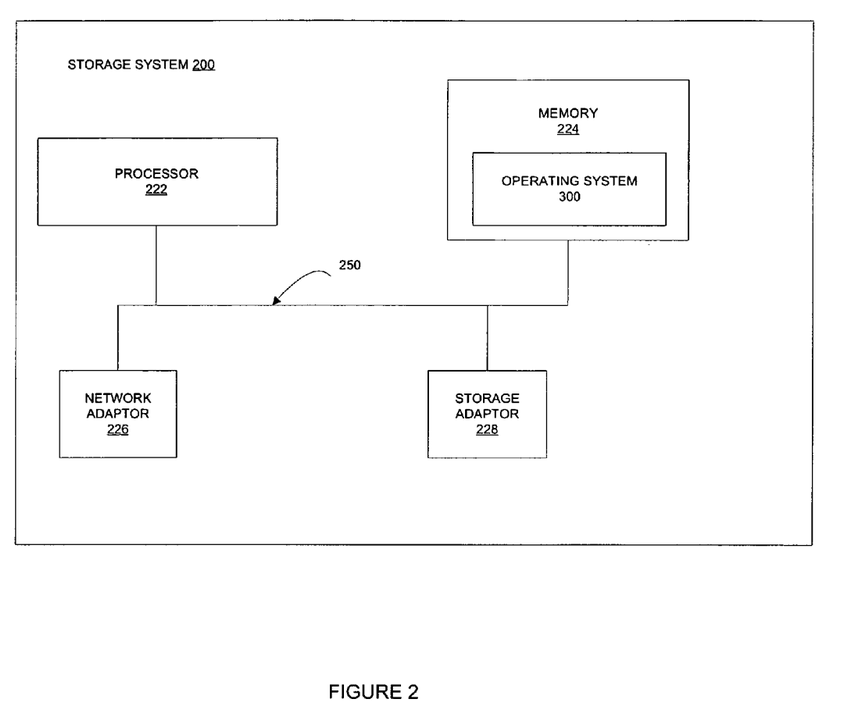
FIG. 2 is a schematic block diagram of a storage server that may be used with one embodiment of the present invention.

Additional details of one embodiment of a storage server are illustrated in FIG. 2. A storage system 200 comprises a processor 222, a memory 224, a network adaptor 226, and a storage adaptor 228, interconnected by a system bus 250.

In the illustrative embodiment, the memory 224 comprises storage locations that are addressable by the processor and adaptors for storing software program code. A storage operating system 300, portions of which are typically resident in memory and executed by the processing elements, functionally organizes the system 200 by, inter alia, invoking storage operations executed by the storage system. It will be apparent to those skilled in the art that other processing and memory means, including various computer readable media, may be used for storing and executing program instructions pertaining to the inventive technique described herein.

The network adaptor 226 comprises the mechanical, electrical and signaling circuitry needed to connect the storage system 200 to clients (e.g., the clients 140 of FIG. 1) over a computer network. The storage adaptor 228 cooperates with the storage operating system 300 executing on the system 200 to access information requested by a user (or client).

Figure 3:
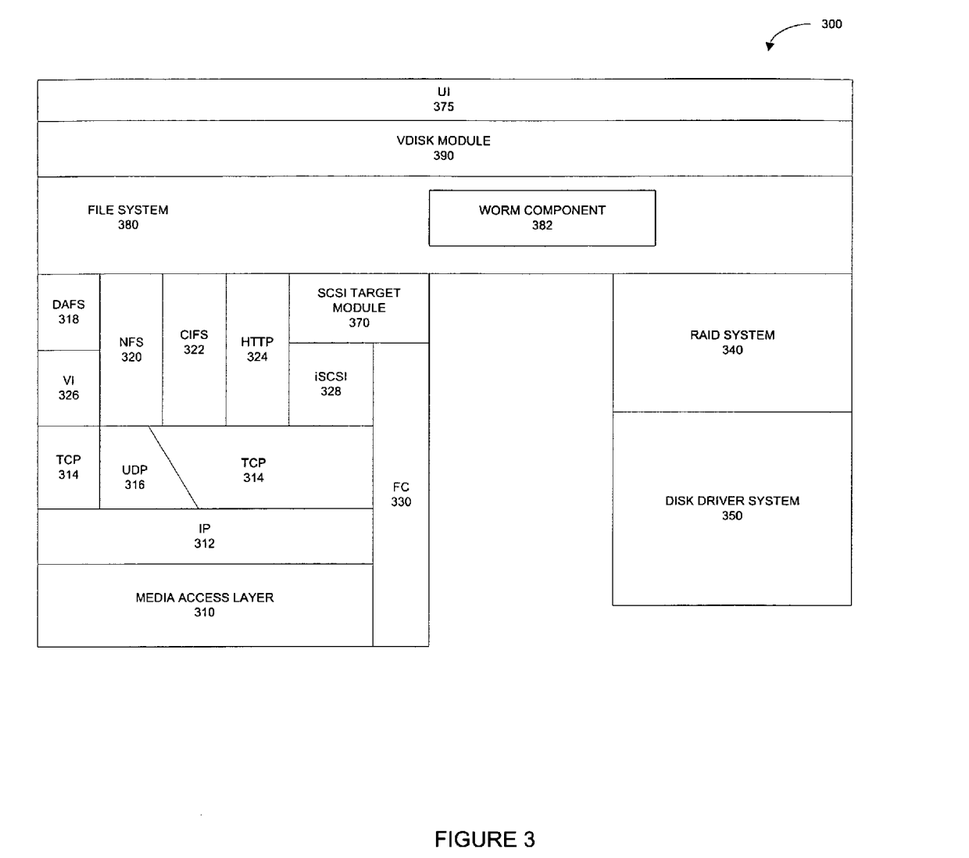
FIG. 3 is a schematic block diagram of a storage operating system that may be used with one embodiment of the present invention.

FIG. 3 illustrates the operating system 300 in greater details according to one embodiment of the invention. As used herein, the term "storage operating system" generally refers to the computer-executable code operable on a computer that manages data access and may implement file system semantics, such as the Data ONTAP® storage operating system, implemented as a microkernel, and available from Network Appliance, Inc. of Sunnyvale, Calif., which implements a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications.

The storage operating system 300 comprises a series of software layers organized to form an integrated network protocol stack or, more generally, a multi-protocol engine that provides data paths for clients to access information stored on the storage system using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A virtual interface (VI) layer 326 implements the VI architecture to provide direct access transport (DAT) capabilities, such as remote direct memory access (RDMA), as required by the DAFS protocol 318.

An iSCSI driver layer 328 provides block protocol access over the TCP/IP network protocol layers, while a FC driver layer 330 receives and transmits block access requests and responses to and from the storage system. The FC and iSCSI drivers provide FC-specific and iSCSI-specific access control to the blocks and, thus, manage exports of LUNs to either iSCSI or FCP or, alternatively, to both iSCSI and FCP when accessing the blocks on the storage system. In addition, the storage operating system includes a storage module embodied as a RAID system 340 that manages the storage and retrieval of information to and from the volumes/disks in accordance with I/O operations, and a disk driver system 350 that implements a disk access protocol such as, e.g., the SCSI protocol.

Bridging the disk software layers with the integrated network protocol stack layers is a virtualization system that is implemented by a file system 380 interacting with virtualization modules illustratively embodied as, e.g., vdisk module 390 and SCSI target module 370. The vdisk module 390 is layered on the file system 380 to enable access by administrative interfaces, such as a user interface (UI) 375, in response to a user (system administrator) issuing commands to the storage system. The SCSI target module 370 is disposed to provide a translation layer of the virtualization system between the block (LUN) space and the file system space, where LUNs are represented as blocks. The UI 375 is disposed over the storage operating system in a manner that enables administrative or user access to the various layers and systems.

The file system 380 is illustratively a message-based system that provides logical volume management capabilities for use in access to the information stored on the storage devices, such as disks. That is, in addition to providing file system semantics, the file system 380 provides functions normally associated with a volume manager. These functions include (i) aggregation of the disks, (ii) aggregation of storage bandwidth of the disks, and (iii) reliability guarantees, such as mirroring and/or parity (RAID). The file system 380 illustratively implements a write anywhere file system having an on-disk format representation that is block-based using, e.g., 4 kilobyte (kB) blocks and using index nodes ("inodes") to identify files and file attributes (such as creation time, access permissions, size and block location).

The file system 380, in one embodiment, may include a WORM component 382. The WORM component 382 may be configured to identify files that, according to a preset criteria, may be considered to be closed (i.e., when an application completed modification operations on the file) and commit files that have not been modified for a predetermined period of time to WORM status.

Figure 4:
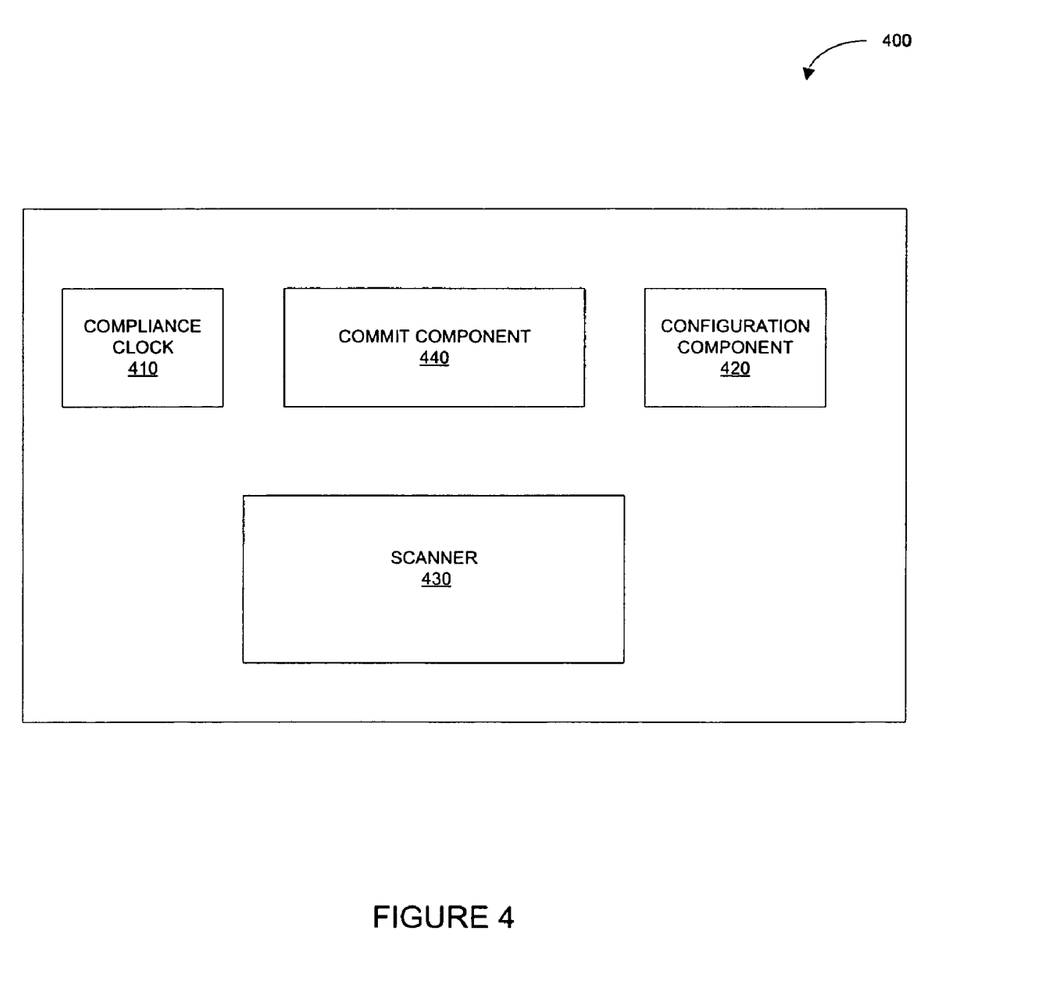
FIG. 4 is a schematic block diagram of a WORM component, according to one embodiment of the present invention.

FIG. 4 is a schematic block diagram of a WORM component 400, according to one embodiment of the present invention. The WORM component 400 may include a compliance clock 410, a configuration component 420, a scanner 430, and a commit component 440.

The compliance clock 410, in one embodiment, is different from a system clock in that the compliance clock 410 has certain security features that restrict any user from modifying the time on it. In one embodiment, the commands that could be used to modify the clock are disabled for the compliance clock 410. The time the compliance clock has (compliance clock time) is periodically written to all of the volumes on the storage system, both the WORM volumes and the non-WORM volumes. In one embodiment, when a volume is mounted or brought on line, the compliance clock time that was last written to that volume is compared to the current compliance clock time for the system and, if the compliance clock time for the volume is earlier than the compliance clock time for the system, the system's compliance clock time is moved back to match the compliance clock time that was last written for the volume. Thus, from the point of view of any volume, the compliance clock 410 never jumps forward.

Returning to FIG. 4, the configuration component 420 may be utilized to define various settings associated with a WORM volume. In one embodiment, the configuration component 420 permits an administrator to specify an autocommit period (e.g., utilizing a CLI interface or a GUI interface) that indicates when a file may be committed to WORM status after the file has been closed for writing. Other settings may include retention period for files that have been committed to WORM status, as well as a definition of what constitutes a modification operation performed on a file. For example, the configuration component 420 may define a modification operation to include a change to a file's contents, but to exclude any change to a file's attributes. Every time a file in the storage system is created or modified (e.g., by a compliance application), a modification time stamp (here, referred to as "mtime") is updated.

Another component illustrated in FIG. 4 is the scanner 430. The scanner 430 may be configured to scan the files on a WORM volume and to identify those files that are closed and hence are ready to be committed to WORM status. This determination may be made, in one embodiment, by comparing the modification time stamp for a file (the mtime) with the current compliance clock value (compliance time). In one embodiment, the modification time stamp for a file (the mtime) may be stored in the file's inode along with other metadata related to the file. If the difference between the mtime and the compliance time for a file exceeds the autocommit period, the scanner 430 may identify the file as ready to be committed to WORM status. The scanner 430 then communicates information regarding the files that are ready to be committed to WORM status to the commit component 440, and the commit component 440 commits such files to WORM status.

It will be noted, that there may be a delay between the time the scanner 430 identifies a file as being ready to be committed to WORM status and the time the commit component 440 actually commits the file to WORM status. The operations involved in the commit process, in one embodiment, include setting the file's read-only attribute and associating an end of retention time for the file. The commit component 440 may determine retention time for the file utilizing a default retention time value for the volume and the modification time for a file associated with the file. Specifically, retention time may be calculated by increasing mtime by the retention period. In one embodiment, the system will protect a file from deletion and modification until retention time has been reached.

Figure 5:
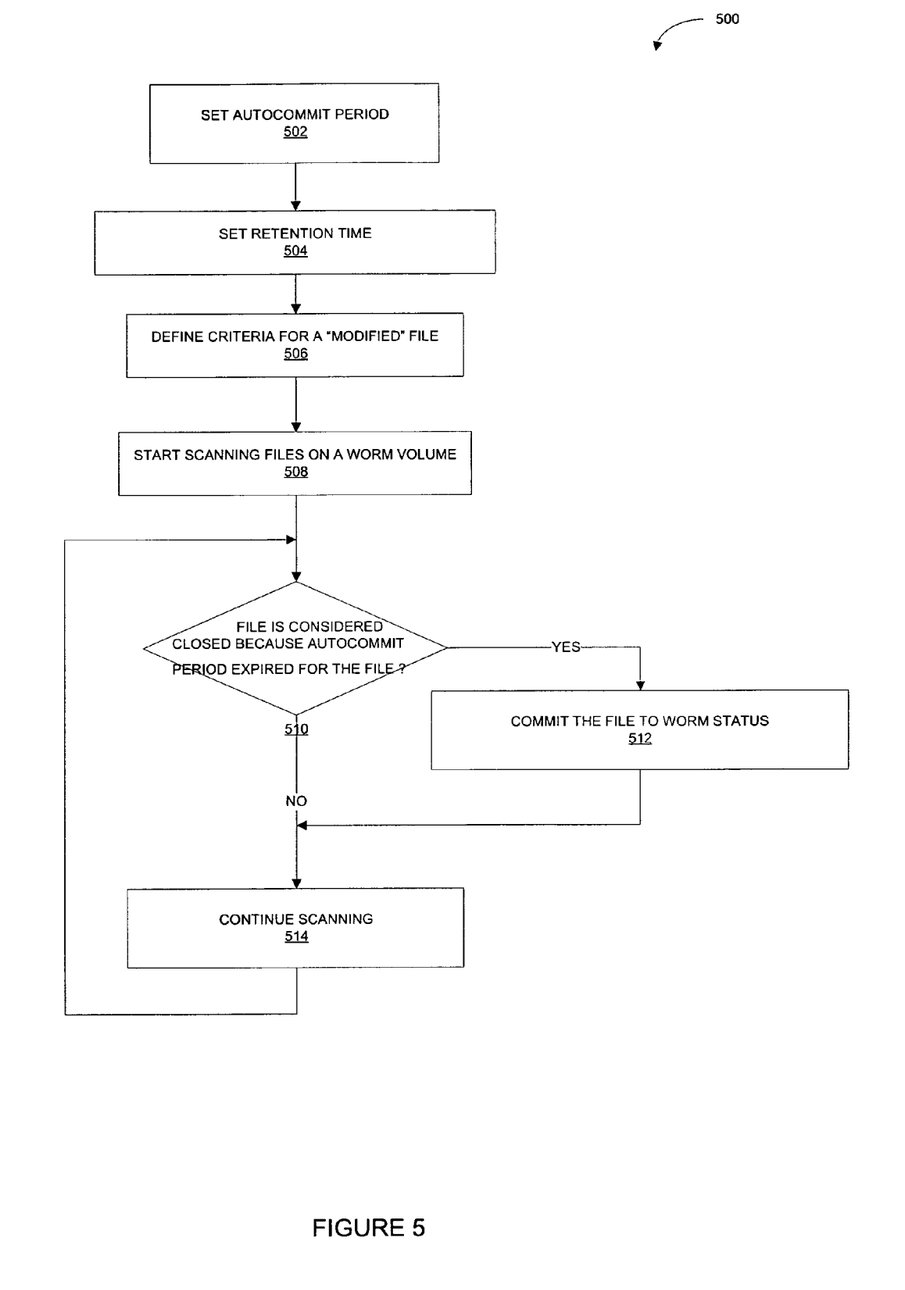
FIG. 5 is a flow chart illustrating a method to automatically commit files to WORM status, according to embodiments of the invention.

FIG. 5 is a flowchart illustrating a method 500 to automatically commit files to WORM status, according to one embodiment of the present invention. The method may be performed by processing logic of the storage system that may comprise hardware (e.g., dedicated logic, programmable logic, microcode, etc.), software (such as run on a general purpose computer system or a dedicated machine), or a combination of both.

Referring to FIG. 5, the method 500 begins at operation 502 with processing logic (e.g. the configuration component 420) setting the autocommit. The autocommit period setting may be, for example, a system-wide parameter. In some embodiments, the autocommit period may be set on a per volume basis. The processing logic sets the retention time on a file to a default or a user-defined value (operation 504) and defines criteria to determine whether a file is closed by checking if the file has been modified (operation 506). At operation 508, the scanner 430 starts scanning the files on a WORM volume (e.g., by accessing inodes associated with the files). For each file, the scanner 430 determines whether the difference between the current compliance time and the file's mtime is greater than the autocommit period (operation 510). If the difference between the current compliance time and the file's mtime is greater than or equal to the autocommit period, the file is committed to WORM status at operation 512. If the difference between the current compliance time and the file's mtime is less than the autocommit period, the scanner 430 continues to scan the files on the WORM volume at operation 514.

Thus, a method and apparatus to automatically commit files to WORM data storage have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Some portions of the foregoing detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description above. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; FLASH memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A storage server comprising: a processor coupled to a memory through a bus; a network adapter configured to provide access to data stored within the storage server to a remote client over a network and through which a notification is received from an application running on the remote client indicating the application has finished modifying a file and the file can be committed to a write-once-read-many (WORM) status; a configuration component configured to set an autocommit period, the autocommit period being a period of time after which the file modified by the application on the remote client is considered closed and is to be committed to WORM status, wherein the file is considered to be closed when the application has completed modifying the file and sends a notification to the storage server that the file is closed or when the file has been unmodified for a period of time exceeding the autocommit period in the absence of notification that the file is closed; a scanner to detect that the autocommit period has expired for a file of a plurality of files stored in a volume, wherein the scanner comprises: logic to scan for the file in the plurality of files in the volume; and logic to determine that the file from the plurality of files has remained unmodified for at least the autocommit period; and a commit component to commit the file to WORM status in response to receiving the notification from the application on the remote client that the file is closed or detecting that the file has remained unmodified for at least the autocommit period; wherein the remote client is configured to execute multiple applications having different associated autocommit periods.

2. The storage server of claim 1, wherein the configuration component is further to set a retention period.

3. The storage server of claim 2, wherein the commit component is to set a retention for the file based on the retention period.

4. The storage server of claim 2, wherein the retention period is a default retention period.

5. The storage server of claim 1, wherein metadata associated with the volume identifies the volume as a WORM volume.

6. The storage server of claim 1, wherein the commit component is to commit the file to WORM status by designating the file as read only.

7. A method in a network storage system implemented at least partially as computer hardware comprising: waiting to receive notification, from an application running on a remote client over a network, that the application has finished modifying a file and the file can be committed to a write-once-read-many (WORM) status; setting an autocommit period for the file stored in the network storage system, the autocommit period being a period of time after which the file modified by the application on the remote client is considered closed and is to be committed to WORM status, wherein the file is considered to be closed when the application has completed modifying the file and sends notification to the network storage system that the file is closed or when the file has been unmodified for a period of time exceeding the autocommit period in the absence of notification that the file is closed; detecting that the autocommit period has expired for the file of a plurality of files stored in a volume, the detecting comprising: scanning for the file in the plurality of files in the volume; and determining that the file has remained unmodified at least for the autocommit period; and committing the file to WORM status in response to receiving the notification from the application on the remote client that the file is closed or detecting that the file has remained unmodified for at least the autocommit period in spite of failing to receive notification that the file is closed; wherein the remote client is configured to execute multiple applications having different associated autocommit periods.

8. The method of claim 7, further comprising setting a retention period.

9. The method of claim 8, wherein committing the file to WORM status comprises setting a retention for the file based on the retention period.

10. The method of claim 7, wherein committing the file to WORM status comprises designating the file as read only.

11. The method of claim 7, wherein determining that the file has remained unmodified is based on a predetermined definition of a modifying operation.

12. The storage server of claim 3, further comprising: a compliance clock, wherein commands that can be used to modify the compliance clock are disabled, wherein the scanner is configured to detect that the file has been unmodified for the autocommit period with respect to a current reading of the compliance clock.

13. The storage server of claim 12, wherein a commit component is to determine a retention for the file based on the current compliance clock reading and the retention period.

14. A machine-readable storage medium having stored thereon data representing sets of instructions which, when executed by a machine, cause the machine to: wait to receive notification over a network from an application running on a remote client that the application has finished modifying a file and the file can be committed to a write-once-read-many (WORM) status; set an autocommit period, the autocommit period being a period of time after which the file modified by the application on the remote client is considered closed and is to be committed to WORM status, wherein the file is considered to be closed when the application has completed modifying the file and sends notification to the network storage system that the file is closed, or the file has been unmodified for a period of time exceeding the autocommit period in the absence of notification that the file is closed; detect that the autocommit period has expired for the file, wherein the detecting is measured from a time of most recent modification of the file; and commit the file to WORM status in response to receiving the notification from the application on the remote client that the file is closed or detecting the autocommit period has expired; wherein the remote client is configured to execute multiple applications having different associated autocommit periods.

15. The method of claim 7, further comprising:
outputting a message to indicate that the file has been automatically committed to WORM status.

* * * * *